US010262228B2

(12) United States Patent
Gujar et al.

(10) Patent No.: US 10,262,228 B2
(45) Date of Patent: Apr. 16, 2019

(54) AUTOMATED REALIZATION OF HAND-DRAWN TOPOLOGIES

(71) Applicant: NICIRA, INC., Palo Alto, CA (US)

(72) Inventors: Bhagyashree Gujar, Pune (IN); Dimal Baby, Pune (IN); Nikhil Bokare, Pune (IN); Devidas Gargote, Pune (IN)

(73) Assignee: Nicira, Inc., Palo Alto, CA (US)

( * ) Notice: Subject to any disclaimer, the term of this patent is extended or adjusted under 35 U.S.C. 154(b) by 215 days.

(21) Appl. No.: 15/238,733

(22) Filed: Aug. 17, 2016

(65) Prior Publication Data

US 2017/0286799 A1    Oct. 5, 2017

(30) Foreign Application Priority Data

Apr. 1, 2016   (IN) .............................. 201641011704

(51) Int. Cl.
*G06K 9/00* (2006.01)
*G06K 9/46* (2006.01)
*G06T 7/00* (2017.01)

(52) U.S. Cl.
CPC .......... *G06K 9/4671* (2013.01); *G06T 7/0081* (2013.01); *G06T 2207/10004* (2013.01)

(58) Field of Classification Search
CPC .......... G06K 9/4671; G06K 9/00–9/84; G06T 7/0081; G06T 2207/10004
See application file for complete search history.

(56) References Cited

U.S. PATENT DOCUMENTS

| 6,014,503 A * | 1/2000 | Nagata ................ G06F 17/5004 700/182 |
| 9,934,431 B2 * | 4/2018 | Prebble .............. G06K 9/00456 |
| 2014/0313216 A1 * | 10/2014 | Steingrimsson ... G06K 9/00402 345/589 |
| 2017/0039193 A1 * | 2/2017 | Mustafi ............... G06F 17/2881 |

* cited by examiner

*Primary Examiner* — Sean T Motsinger
(74) *Attorney, Agent, or Firm* — Patterson + Sheridan, LLP (57) ABSTRACT

Techniques disclosed herein provide an approach for automated realization of hand-drawn topologies. In one embodiment, a topologizer application is configured to parse an image depicting a hand-drawn topology and identify shapes and relationships between the shapes in the image. The topologizer may convert the hand-drawn topology to polygons and then identify the polygons as being, e.g., particular shapes and arrows representing relationships between the shapes. The identified shapes and relationships are then output in a machine-readable format for consumption, in which the shapes are mapped to corresponding components of a computing system and deployed based on the mapping and the relationships indicated in the topologizer output.

20 Claims, 6 Drawing Sheets

AUTOMATED REALIZATION OF HAND-DRAWN TOPOLOGIES

RELATED APPLICATION

Benefit is claimed under 35 U.S.C. 119(a)-(d) to Foreign Application Serial No. 201641011704 filed in India entitled "AUTOMATED REALIZATION OF HAND-DRAWN TOPOLOGIES", filed on Apr. 1, 2016, by Nicira, Inc., which is herein incorporated in its entirety by reference for all purposes.

BACKGROUND

Hand-drawn sketches are a natural way of expressing ideas. Software developers often draw diagrams to represent ideas and design new models. One type of diagram that developers draw is a topology diagram depicting computing system components and their arrangement/relationships. Traditionally, such topologies or hierarchies might be designed in hand-drawn diagrams on paper or on a white board. However, no automated tools exist for directly converting such hand-drawn topologies to actual deployments.

SUMMARY

One embodiment provides a method for automatically deploying a topology in a computing system. The method generally includes receiving an image depicting the topology and parsing the received image to identify shapes and relationships between the shapes in the received image. The parsing includes converting the topology depicted in the image into polygons, and the relationships between the shapes are determined based on at least angles of one or more of the polygons representing arrows between the shapes. The method further includes mapping each of the shapes to a corresponding system component. In addition, the method includes creating instances of the corresponding system components based on the mapping of shapes to corresponding system components and the identified relationships.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for automated realization of hand-drawn topologies. As used herein, "topology" refers to a design of components and their relationships in a computing system. In one example, a topology can specify a virtualized infrastructure comprised of virtual machines, computer servers, storage networks and arrays, and networks that are grouped into clusters and pools of resources. Other examples of topologies include network topologies specifying arrangements of network components, and hierarchies of inventory objects and/or relationships between entities in a virtualized computing system. A topologizer application, also referred to herein as the "topologizer," is configured to identify shapes and relationships between the shapes in an image depicting a hand-drawn topology. In one embodiment, the topologizer may convert the hand-drawn topology to polygons and identify the polygons as being particular shapes and arrows that represent relationships between the shapes. The identified shapes and relationships between shapes may then be output in a machine-readable format that is consumed by mapping the identified shapes to corresponding components of a computing system and deploying those components based on the mapping and the relationships indicated in the topologizer output.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
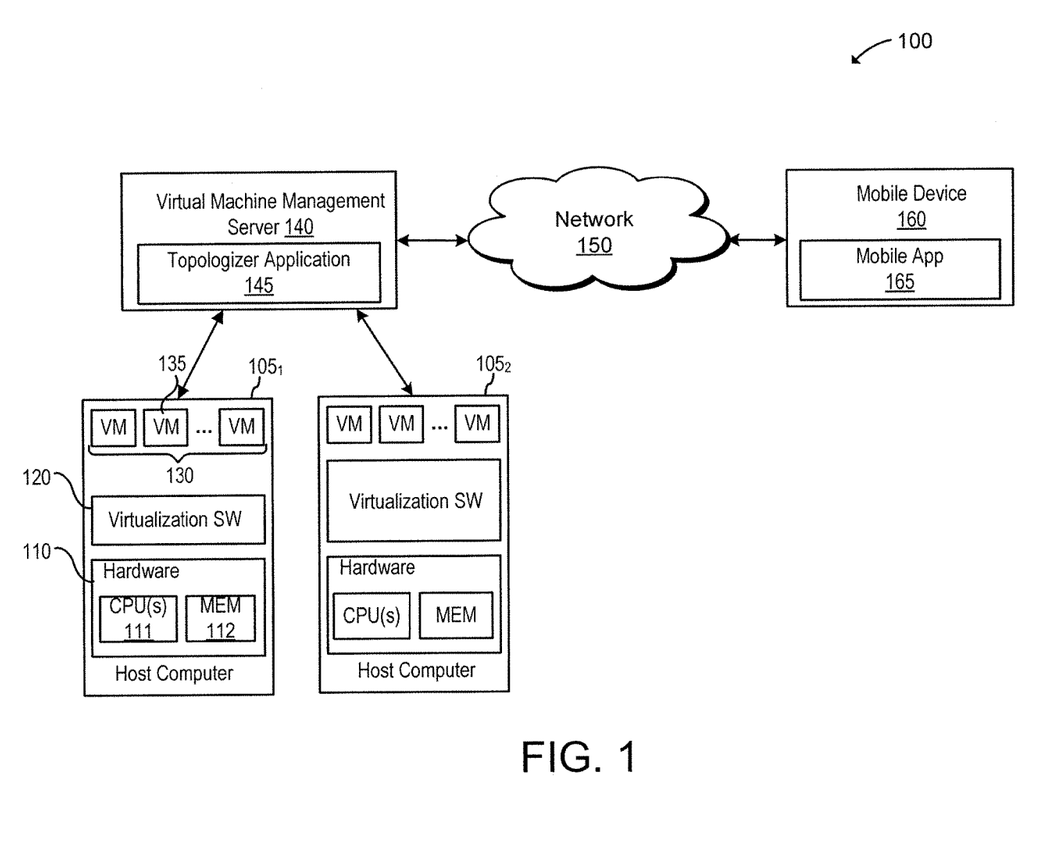
FIG. 1 depicts a simplified block diagram of a system in which an embodiment may be implemented.

FIG. 1 depicts a simplified block diagram of a system 100 in which one or more embodiments may be implemented. As shown, desktops run in virtual machines 130 which are instantiated on a group of host computers commonly referred to as a cluster (depicted in FIG. 1 as host computers $105_1$ and $105_2$). Each of host computers $105_1$ and $105_2$ includes virtualization software 120 and hardware 110, including one or more CPUs 111 and system memory 112, and host computers $105_1$ and $105_2$ may be coupled to a shared storage device (not shown).

Virtualization software 120 performs system resource management and virtual machine resource emulation. Virtual machine resource emulation may be performed by a virtual machine monitor (VMM) component (not shown). In some implementations, each virtual machine 130 may have a corresponding VMM instance. Depending on implementation, virtualization software 120 may be unhosted or hosted. Unhosted virtualization software generally relies on a specialized virtualization kernel for managing system resources, whereas hosted virtualization software relies on a commodity operating system—the "hosting operating system"-such as Windows, Mac OS X, or Linux to manage system resources.

A virtual machine management server 140 controls provisioning of VMs, powering of VMs on and off, and resource management of the VMs in the host computers, among other things. In a particular embodiment, VM management server 140 may run vCenter, a product commercially available from VMware, Inc of Palo Alto, Calif. Although shown as a separate computer system, it should be recognized that VM management server 140 may instead be implemented in other ways, such as a VM that runs in one of host computers $105_1$ and $105_2$. The combination of virtual machine management server 140, host computers $105_1$ and $105_2$, and components therein form a virtualized computing system.

As shown, a topologizer application 145 also runs in virtual machine management server 140, although topologizer application 145 may run elsewhere (e.g., in another server) in alternative embodiments. In one embodiment, topologizer 145 may be a server application, such as a servlet. Topologizer 145 is configured to analyze images of hand-drawn topologies, received over a network 150 from a mobile application 165 running on a mobile device 160, and to identify shapes and relationships between the shapes in the images. For example, the mobile application 165 may transmit images captured via a camera of mobile device 160 or scanned images to topologizer 145, and topologizer 145 may analyze such images to identify shapes and relationships. The identified shapes and relationships between shapes may then be output in a machine-readable format that topologizer 145 consumes by mapping the shapes to corresponding components of the virtualized computing system and deploying those components with the identified relationships. In one embodiment, instances of the identified components may be created by invoking application programming interfaces (APIs) provided by VM management server 140 software (e.g., vCenter), as discussed in greater detail below.

It should be understood that topologizer 145 may be implemented differently in alternative embodiments, e.g., as an application in mobile device 160 that generates output consumed by VM management server 140. In yet another embodiment, topologizer 145 may identify shapes and relationships in images depicting hand-drawn topologies and directly map those shapes to corresponding system components that are then deployed.

Figure 2:
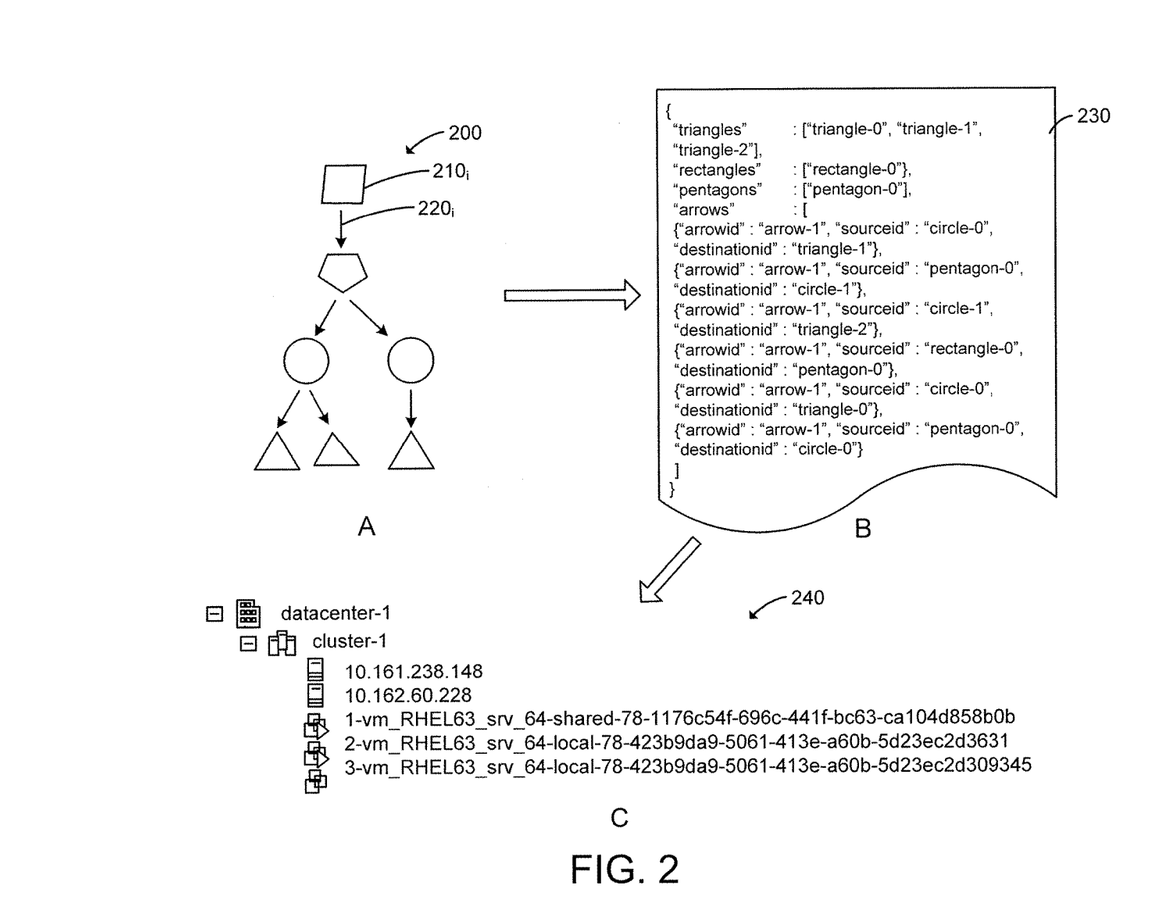
FIG. 2 illustrates an approach for automatically realizing a hand-drawn topology, according to an embodiment.

FIG. 2 illustrates an approach for automatically realizing a hand-drawn topology, according to an embodiment. As shown in panel A, an example image of hand-drawn topology 200 includes shapes 210$_i$ and arrows 220$_i$ connecting the shapes. Topology 200 may be drawn on, e.g., a whiteboard, with shapes 210$_i$ representing components of a computing system and arrows 220$_i$ representing relationships between those components. For example, in the case of a virtualized computing system with VMs running on host computers that are clustered together in one or more datacenters, squares in topology 200 may represent the datacenters, pentagons may represent host computer clusters, circles may represent host computers, and triangles may represent VMs. It is assumed herein that the topology has a "tree" structure and is drawn using shapes and arrows, such as topology 200 depicted in panel A, but techniques disclosed herein may be employed to automatically deploy other types of topologies and drawings that include text and/or color as well as shapes (e.g., using text and/or color recognition), among other things. For example, the squares, pentagons, circles, and triangles in topology 200 may be replaced or enhanced with words or abbreviations for "datacenter," "host clusters," "host computers," and "VMs," or colors representing the same, and text and/or color recognition used to identify what is depicted in topology 200 so that those components may then be deployed.

Figure 3:
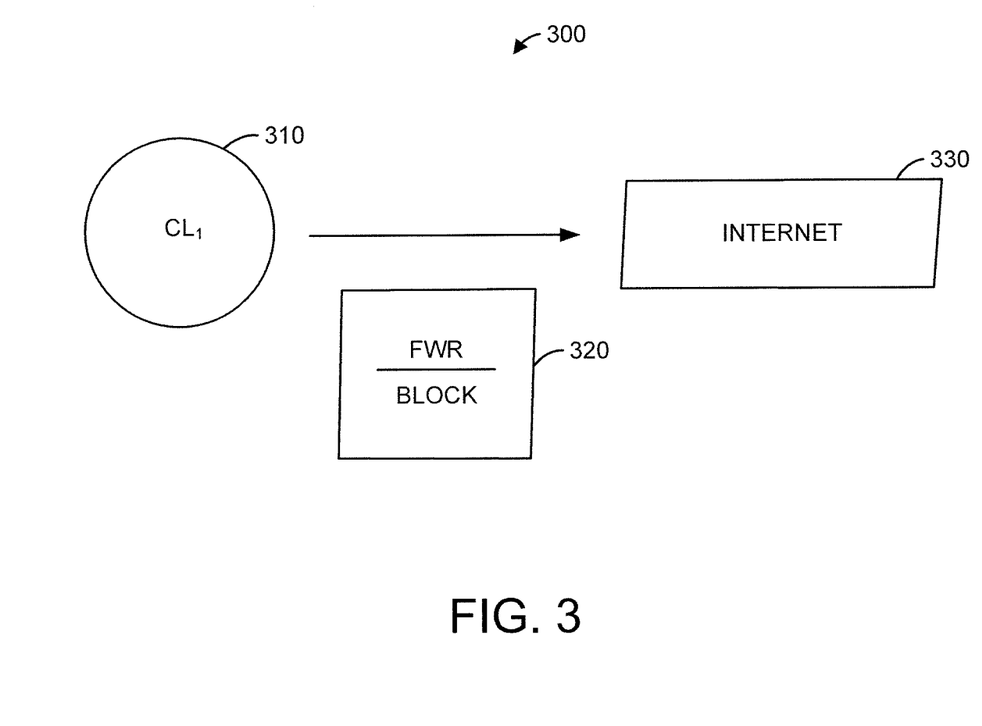
FIG. 3 illustrates another hand-drawn topology that can be deployed, according to an embodiment.

Although panel A shows a topology for a virtualized computing systems, topologizer 145 may generally be configured to parse images depicting any feasible topology and to deploy the same. For example, a user may draw a network topology indicating rules and relationships for network entities, such as the image of network topology 300 with a firewall rule 320 blocking internet traffic 330 for a particular cluster 310 that is depicted in FIG. 3. Topologizer 145 may then parse image 300 and generate output in a machine-readable format that is consumed by, e.g., automatically defining appropriate security policies and creating security group(s) to which the cluster 310 is added so as to apply the security policies. Although security policies such as firewall rule 320 are applied to clusters, internally the security policies may be applied to all the VMs in the clusters.

Returning to FIG. 2, as shown in the panel B, topologizer 145 receives the image of hand-drawn topology 200 and analyzes topology 200 to generate a machine-readable output 230 that lists shapes and relationships been the shapes in hand-drawn topology 200. As discussed in greater detail below, topologizer 145 may convert hand-drawn topology 200 into polygons and identify various shapes (e.g., triangles, rectangles, etc.) based on the number of sides of each polygon. Topologizer 145 may further identify arrows, including the heads and tails of the arrows, in hand-drawn topology 200 based on the angles formed at vertices of polygons representing the arrows. Topologizer 145 then adds the identified shapes and arrows to output 230, assigning a unique identifier (ID) to each shape and arrow and indicating the source and destination shapes associated with the tails and heads of each arrow. Continuing the example of the virtualized computing system above in which squares represent datacenters, pentagons represent host computer clusters, circles represent host computers, and triangles represent VMs, topologizer 145 may provide the following JSON (JavaScript Object Notation) output for hand-drawn topology 200:

```
{   "triangles"     : ["triangle-0", "triangle-1", "triangle-2"],
    "rectangles"    : ["rectangle-0"],
    "circles"       : ["circle-0", "circle-1"],
    "pentagons"     : ["pentagon-0"],
    "arrows"        : [{"arrow-id" : "arrow-1", "sourceid" : "circle-0", "destinationid" : "triangle-1"},
    {"arrow-id" : "arrow-1", "sourceid" : "circle-0", "destinationid" : "triangle-1"},
    {"arrow-id" : "arrow-2", "sourceid" : "pentagon-0", "destinationid" : "circle-1"},
    {"arrow-id" : "arrow-3", "sourceid" : "circle-1", "destinationid" : "triangle-2"},
    {"arrow-id" : "arrow-4", "sourceid" : "rectangle-0", "destinationid" : "pentagon-0"},
    {"arrow-id" : "arrow-5", "sourceid" : "circle-0", "destinationid" : "triangle-0"},
    {"arrow-id" : "arrow-6", "sourceid" : "pentagon-0", "destinationid" : "circle-0"}
    ]
}.
```

This JSON format output specifies IDs of shapes in hand-drawn topology 200, as well as a list of arrows in topology 200 and the IDs of source and destination shapes associated with the arrows.

The JSON format output from topologizer 145 may be consumed by parsing the output and creating instances of system components based on a mapping of shapes in the output to corresponding system components and the relationships between the shapes specified in the output. For example, beginning at a root node in the topology indicated by output 230, topologizer 145 may map rectangle-0 to a datacenter and then create such a datacenter. Topologizer 145 may further traverse the tree child by child based on the relationships indicated by arrows in output 230, identify the parent of each node, and create instances of the corresponding system components with the appropriate parents. Panel C shows an example of the final deployment result, as displayed in an excerpt of a deployment graphical user interface (GUI) 240 showing the deployed result. As shown, a datacenter, host cluster, two hosts, and three VMs have been deployed according to the hand-drawn topology in image 200. In one embodiment, APIs may be invoked to create instances of system components such as the datacenters, host clusters, hosts, VMs, and the like.

Figure 4:
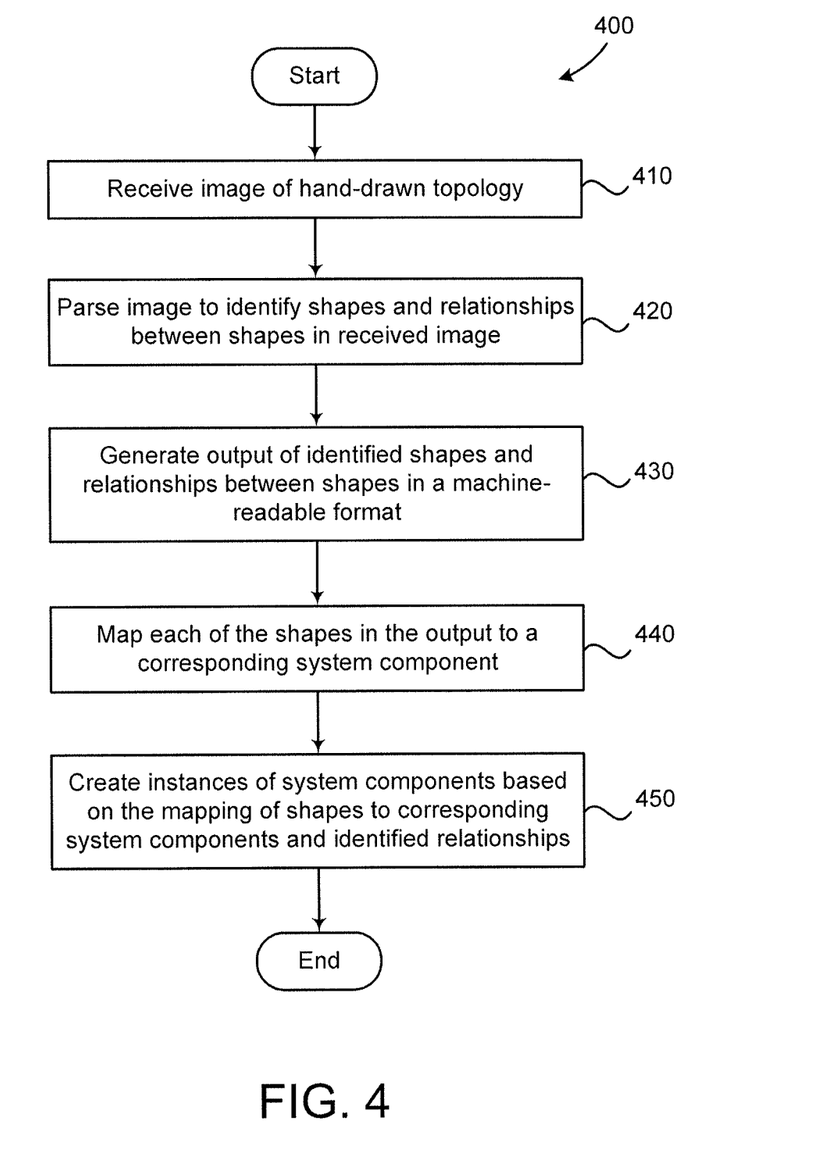
FIG. 4 illustrates a method for deploying a hand-drawn topology, according to an embodiment.

FIG. 4 illustrates a method 400 for deploying a hand-drawn topology, according to an embodiment. As shown, method 400 begins at step 410, where topologizer application 145 receives an image of a hand-drawn topology. In one embodiment, topologizer 145 may run in a server (e.g., as a servlet) and receive images to analyze from mobile application 165, as discussed above with respect to FIG. 1. For example, mobile device application 165 may transmit images to topologizer 145 via network 150, and, after parsing images depicting hand-drawn topologies, topologizer 145 may send back to mobile application 165 machine-readable output (e.g., JSON text) specifying the hand-drawn topologies, which the user may then verify and deploy.

At step 420, topologizer 145 parses the received image to identify shapes and relationships between the shapes in the received image. In one embodiment, topologizer 145 may convert images of hand-drawn topologies into polygons and identify shapes and arrows from the polygons. As discussed, the shapes may be identified based on the number of sides each polygon has (e.g., three sides is a triangle, four sides is a rectangle, etc.). Further, arrows, and the heads and tails of arrows, may be identified based on the angles formed in a polygon representing the arrow and, more specifically, whether such angles are greater than 180 degrees (i.e., reflex angles) or not (i.e., non-reflex or normal angles). As discussed in greater detail below, arrows have particular sequences of reflex and normal angles, and the vertices that are heads and tails of an arrow may be identified based on the location of associated angles in the sequence of angles.

At step 430, topologizer 145 generates an output of the identified shapes and relationships between the shapes in a machine-readable format. For example, topologizer 145 may generate, based on the identified shapes and relationships in the form of arrows connecting source shapes to destination shapes, the following JSON format output:

```
{    "triangles"   :[<IDs of triangles>],
     "rectangles"  :[<IDs of regtangles>],
     "circles"     :[<IDs of circles>],
     "pentagons"   :[<IDs of pentagons>],
     "arrows"      :[{<IDs of arrows>,<source shape ID>, <destination shape ID>}]
}.
```

As discussed above with respect to FIG. 2, this type of JSON format output specifies IDs of shapes in the image, as well as a list of arrows in the image and the IDs of source and destination shapes associated with the arrows. It should be understood that, although discussed herein with respect to JSON output, any feasible output format (e.g., XML (extensible markup language) format, UML (unified modeling language) format, or another structured format) may be used. In one embodiment, the output may also be presented to a user for verification that the identified shapes and relationships match the hand-drawn topology. As discussed, topologizer 145 may, e.g., send back the output to mobile application 165 that then presents the output to a user for verification, after which the user may choose to deploy (or not to deploy) system components based on the output. In an alternative embodiment, mobile application 165 may itself parse images to identify shapes and relationships and generate the corresponding JSON output that the user verifies, after which mobile application 165 may send the JSON output to topologizer application 145 which maps the output to system components and deploys the mapped components.

At step 440, topologizer 145 maps each of the shapes to a corresponding system component. In one embodiment, topologizer 145 may parse the output generated at step 430 and match shapes in the output to system components based on predefined mappings of shapes to corresponding components. Such predefined mappings are also referred to herein as a "template." For example, in the case of the virtualized computing system 100, a template may include mappings of shapes/text to corresponding virtual machine hosts, data centers, virtual machines, etc. In some embodiments, topologizer 145 may also accept templates defined by users. In such a case, users may be permitted to dynamically register custom shapes and mappings of those shapes to system components. For a real-time application, a library of templates may be constructed.

In one embodiment, topologizer 145 may further determine whether the topology is valid for a given/selected template, beginning with a root node in the topology and working down the tree. In such a case, predefined rules may specify what is and is not a valid topology for the template. For example, the rules may specify that in a valid virtualized computing system topology, VMs can be children of hosts that are themselves children of host clusters and datacenters, but not the other way around.

At step 450, topologizer 145 creates instances of the system components based on the mapping of shapes to corresponding system components and identified relationships. In one embodiment, topologizer 145 may begin at the root node of the topology (e.g., a datacenter in the virtualized computing system example) and create an instance of the corresponding system component (e.g., the datacenter). In such a case, topologizer 145 may further traverse the topology tree child by child based on the identified relationships, such as arrows in topologizer's 145 output, identify the parent of each node, and create instances of the corresponding system components having the appropriate parents. For example, VM management server 140 software may provide APIs which can be invoked to create components such as datacenters, VM host clusters, VMs, and the like, and topologizer 145 may make the appropriate API calls to create/deploy the components based on the mapping of shapes to corresponding system components and the identified relationships between components.

Figure 5:
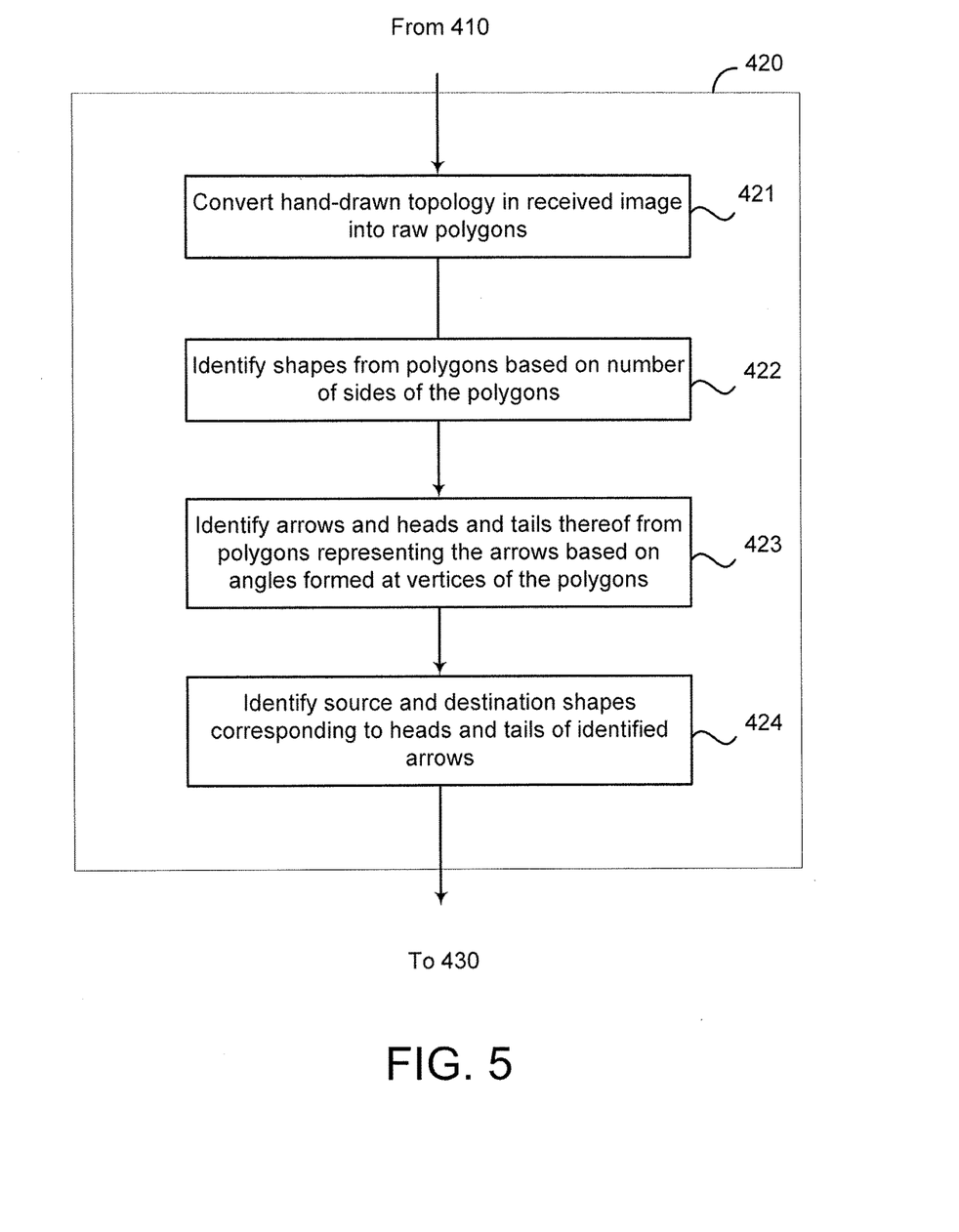
FIG. 5 illustrates in greater detail one of the steps of the method in FIG. 4, according to an embodiment.

FIG. 5 illustrates in greater detail step 420 of method 400, according to an embodiment. As shown, at step 421, topologizer 145 converts the hand-drawn topology in the received image into raw polygons. In one embodiment, topologizer 145 applies a computer vision library to perform such a conversion to polygons. In such a case, topologizer 145 may use the computer vision library to detect polygons by pre-processing an input image through filtering to reduce noise, converting the pre-processed image to grayscale for better results, and finding contours in the image, which may be defined as curves joining all continuous points along a bounding and having the same color or intensity. In one example, topologizer 145 may make use of a library such as OpenCV (Open Source Computer Vision) to detect polygons, or detect polygons in any other feasible manner.

At step 422, topologizer 145 identifies shapes from the polygons based on the number of sides that the polygons detected at step 421 have. For example, a polygon with three sides may be identified as a triangle, a polygon with four sides may be identified as a quadrilateral, etc. In addition, a polygon having more than a predetermined number (e.g., 7) of sides may be identified as a circle.

At step 423, topologizer 145 identifies arrows and heads and tails thereof from the polygons based on angles formed at vertices of the polygons. It will be assumed that a hand-drawn arrow is converted to a hexagon, and it is further assumed that angles are measured in the counterclockwise direction. In one embodiment, topologizer 145 may loop through every vertex of such a hexagon in a cyclic fashion and determine whether the angle formed by each vertex and its neighbors is greater than 180 degrees (i.e., a reflex angle) or not (i.e., a non-reflex or normal angle). Topologizer 145 may further mark the angle as R for reflex angle and N for normal angle, ultimately producing a string of such labels (e.g., RNRNNN) for the hexagon. Topologizer 145 may then determine whether such a string of labels, considered in a cyclic fashion, matches either the string NNNRNR or the string RRRNRN, which is required for the hexagon to be a right-pointing arrow and a left-pointing arrow, respectively. A string of labels that cannot be made through cycling to match either NNNRNR or RRRNRN is not an arrow. For a string of labels that can be made to match either NNNRNR or RRRNRN, topologizer 145 identifies the middle vertex of three consecutive vertices having the same labeling as the head of the arrow. Then, taking the head vertex as a first vertex, the fourth vertex of the polygon may be identified as the tail of the arrow.

Figure 6:
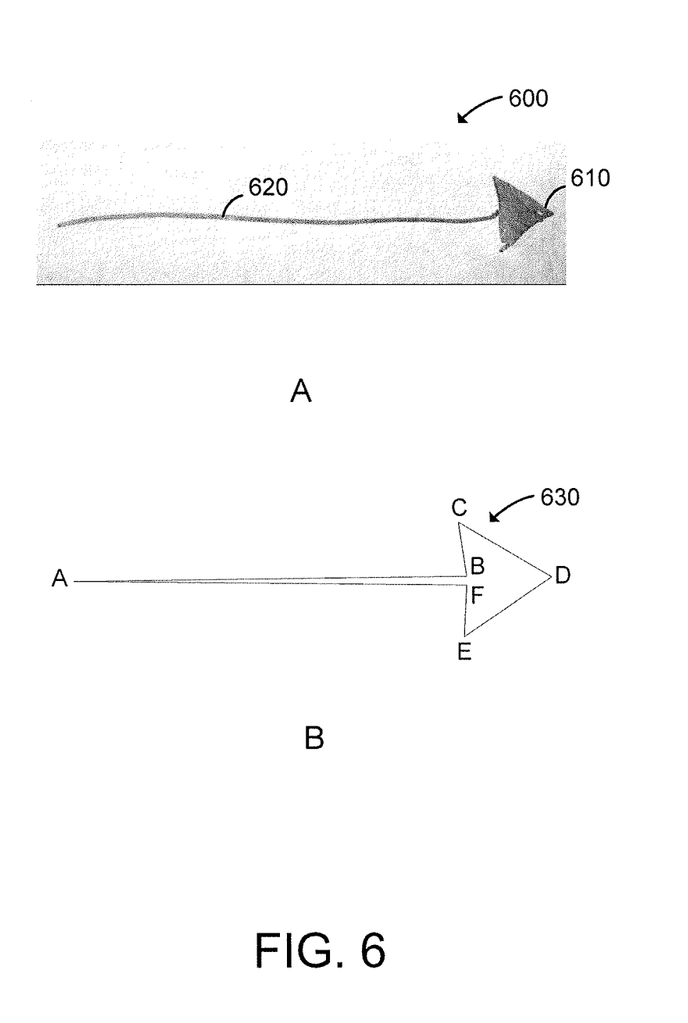
FIG. 6 illustrates an approach for identifying arrows and the heads and tails thereof in a hand-drawn topology, according to an embodiment.

For example, as shown in panel A of FIG. 6, an arrow 600 has a head 610 and a tail 620, which may point to destination and source shapes, respectively, in a hand-drawn topology. Panel B shows a polygon 630 into which arrow 620 is converted, and polygon 630 has vertices A-E. As discussed, topologizer 145 may identify polygon 630 as an arrow and further identify the head and tail of the arrow based on angles formed by each of the vertices A-E and their neighbors. In this case, topologizer 145 may label the angles of polygon 630 for the sequence ABCDEF of vertices as follows, with R indicating a reflex angle and N indicating a normal angle: ∠FAB: N, ∠ABC: R, ∠BCD: N, ∠CDE: N, ∠DEF: N, ∠EFA: R. Topologizer 145 may then determine that polygon 630 represents an arrow because this sequence of labels can be cycled to match NNNRNR. Topologizer 145 may further identify vertices of polygon 630 representing the head and tail of arrow 600 by finding the three consecutive vertices with same labeling (i.e., NNN or RRR) and identify the middle vertex, D in this example, as the head of arrow 600. Taking such a head vertex as the first vertex, topologizer 145 may identify the fourth vertex of polygon 630, A in this case, as the tail of the arrow.

Returning to FIG. 5, at step 424, topologizer 145 identifies source and destination shapes corresponding to the head and tails of the arrows. In one embodiment, topologizer 145 may determine the centroid of each shape and the distance of each such centroid from the head and tail of each arrow. The shape having centroid closest to the head of an arrow may then be identified as the source shape, and the shape having centroid closest to the tail of an arrow may be identified as the destination shape. As discussed, the source and destination shapes may be listed along with the associated arrow(s) and all the other shapes themselves in a machine-readable format, such as the JSON format set forth above.

Although primarily discussed herein with respect to a topologizer application that both generates machine-readable output from images of hand-drawn topologies and consumes such output, in alternative embodiments, topologizer application 145 may be split into smaller pieces. In one embodiment, topologizer 145 may be split into an image recognition component, which analyzes images of hand-drawn topologies to identify shapes and relationships between the shapes, and a separate component that consumes the output by mapping the identified shapes to system components and deploying instances of those components with the identified relationships. For example, the image recognition component may be implemented as a pluggable tool that provides JSON output to an application (or applications) that is a plugin to the image recognition component and consumes its output.

Although primarily discussed herein with respect to an example of deploying hand-drawn topologies, techniques disclosed herein are equally applicable to deploying topologies in non hand-drawn images, such as graphical images created on a computer. That is, rather than receiving an image of a hand-drawn topology as input that is analyzed and deployed, the input image may also be, at least in part, generated using a computer.

Advantageously, techniques disclosed herein automatically deploy hand-drawn (and other) topologies. Such automated deployment may be quicker and more convenient than manual deployment, as no manual effort is required to enter details of a topology into the system to deploy the topology. In addition, techniques disclosed herein allow automated deployment to be based on hand-drawn topologies, which is one of the most common and intuitive methods of representing topologies.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of deploying a virtualized infrastructure in a computing system comprising a plurality of computing devices, the method comprising:
    receiving an image depicting a topology of the virtualized infrastructure;
    parsing the received image to identify shapes and relationships between the shapes in the received image, wherein the parsing includes converting the topology depicted in the image into polygons, and wherein the relationships between the shapes are determined based on at least angles of one or more of the polygons representing arrows between the shapes;
    mapping each of the shapes to a corresponding system component; and
    creating instances of the corresponding system components on the plurality of computing devices based on the mapping of shapes to corresponding system components and the identified relationships, wherein at least one of the corresponding system components comprises a virtual machine (VM).

2. The method of claim 1, further comprising:
    outputting the identified shapes and relationships between the shapes in a machine-readable format,
    wherein mapping each of the shapes to the corresponding system component includes parsing the output in the machine-readable format.

3. The method of claim 2, further comprising, displaying the output to a user for verification, wherein the mapping and creating steps are performed in response to verification by the user that the output accurately specifies the topology depicted in the received image.

4. The method of claim 1,
    wherein the relationships between the shapes are determined by identifying the arrows represented by the one or more polygons and the shapes closest to the heads and tails of the arrows.

5. The method of claim 4, wherein the head and tail of each of the arrows are determined by:
    determining whether each of the angles formed at vertices of a polygon representing the arrow is a reflex angle or a non-reflex angle;
    matching reflex and non-reflex angles at the vertices of the polygon representing the arrow to a sequence of reflex and non-reflex angles of an arrow;
    selecting the head of the arrow as a central vertex in three consecutive vertices in the sequence of angles that are all reflex angles or non-reflex angles; and
    selecting the tail of the arrow as a vertex that is three vertices away from the selected head vertex.

6. The method of claim 1, wherein the instances of the corresponding system components are created responsive to determining that the shapes and the relationships between the shapes represent a valid topology.

7. The method of claim 1, wherein mappings between shapes and system components are predefined by a user.

8. The method of claim 1, further comprising:
identifying text in the received image;
mapping the identified text to one or more corresponding system components,
wherein the instances of the corresponding system components are created based on the mapping of the shapes to system components and the mapping of the text to system components.

9. The method of claim 1, wherein the system components further include at least one of a datacenter, a host computer cluster, and a host computer.

10. The method of claim 1, wherein the image depicting the topology is a hand-drawn image captured via a camera or a scanner.

11. A non-transitory computer-readable storage medium containing a program which, when executed by one or more processors, performs operations for automatically deploying a virtualized infrastructure in a computing system comprising a plurality of computing devices, the operations comprising:
receiving an image depicting a topology of the virtualized infrastructure;
parsing the received image to identify shapes and relationships between the shapes in the received image, wherein the parsing includes converting the topology depicted in the image into polygons, and wherein the relationships between the shapes are determined based on at least angles of one or more of the polygons representing arrows between the shapes;
mapping each of the shapes to a corresponding system component; and
creating instances of the corresponding system components on the plurality of computing devices based on the mapping of shapes to corresponding system components and the identified relationships, wherein at least one of the corresponding system components comprises a virtual machine (VM).

12. The non-transitory computer-readable storage medium of claim 11, the operations further comprising:
outputting the identified shapes and relationships between the shapes in a machine-readable format,
wherein mapping each of the shapes to the corresponding system component includes parsing the output in the machine-readable format.

13. The non-transitory computer-readable storage medium of claim 11,
wherein the relationships between the shapes are determined by identifying the arrows represented by the one or more polygons and the shapes closest to the heads and tails of the arrows.

14. The non-transitory computer-readable storage medium of claim 13, wherein the head and tail of each of the arrows are determined by:
determining whether each of the angles formed at vertices of a polygon representing the arrow is a reflex angle or a non-reflex angle;
matching reflex and non-reflex angles at the vertices of the polygon representing the arrow to a sequence of reflex and non-reflex angles of an arrow;
selecting the head of the arrow as a central vertex in three consecutive vertices in the sequence of angles that are all reflex angles or non-reflex angles; and
selecting the tail of the arrow as a vertex that is three vertices away from the selected head vertex.

15. The non-transitory computer-readable storage medium of claim 11, wherein the instances of the corresponding system components are created responsive to determining that the shapes and the relationships between the shapes represent a valid topology.

16. The non-transitory computer-readable storage medium of claim 11, wherein mappings between shapes and system components are predefined by a user.

17. The non-transitory computer-readable storage medium of claim 11, the operations further comprising:
identifying text in the received image;
mapping the identified text to one or more corresponding system components,
wherein the instances of the corresponding system components are created based on the mappings of the shapes to system components and the mappings of the text to system components.

18. The non-transitory computer-readable storage medium of claim 11, wherein the system components further include at least one of a datacenter, a host computer cluster, and a host computer.

19. The non-transitory computer-readable storage medium of claim 11, wherein the image depicting the topology is a hand-drawn image captured via a camera or a scanner.

20. A system, comprising:
a processor; and
a memory, wherein the memory includes a program executable in the processor to perform operations for automatically deploying a virtualized infrastructure in a computing system comprising a plurality of computing devices, the operations comprising:
receiving an image depicting a topology of the virtualized infrastructure;
parsing the received image to identify shapes and relationships between the shapes in the received image, wherein the parsing includes converting the topology depicted in the image into polygons, and wherein the relationships between the shapes are determined based on at least angles of one or more of the polygons representing arrows between the shapes;
mapping each of the shapes to a corresponding system component; and
creating instances of the corresponding system components on the plurality of computing devices based on the mapping of shapes to corresponding system components and the identified relationships, wherein at least one of the corresponding system components comprises a virtual machine (VM).

* * * * *